United States Patent
Cheng et al.

(10) Patent No.: US 10,616,505 B2
(45) Date of Patent: *Apr. 7, 2020

(54) VIDEO TRANSMISSION SYSTEM

(71) Applicant: NOVATEK MICROELECTRONICS CORP., HsinChu (TW)

(72) Inventors: Jhih-Siou Cheng, New Taipei (TW); Yi-Chuan Liu, Hsinchu County (TW); Hung-Cheng Hsiao, Hsinchu (TW); Ying-Wen Chou, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 15 days.

This patent is subject to a terminal disclaimer.

(21) Appl. No.: 15/676,956

(22) Filed: Aug. 14, 2017

(65) Prior Publication Data

US 2017/0366759 A1   Dec. 21, 2017

Related U.S. Application Data

(63) Continuation of application No. 14/328,078, filed on Jul. 10, 2014, now Pat. No. 9,800,800.

(30) Foreign Application Priority Data

May 8, 2014   (TW) .............................. 103116386 A (51) Int. Cl.
*H04N 5/268* (2006.01)
*H04N 5/38* (2006.01)
(Continued)

(52) U.S. Cl.
CPC ......... *H04N 5/268* (2013.01); *G06F 13/4086* (2013.01); *H04N 5/38* (2013.01); *H04N 5/44* (2013.01)

(58) Field of Classification Search
CPC . H04N 5/268; H04N 5/38; H04N 5/44; G06F 13/4086
See application file for complete search history.

(56) References Cited

U.S. PATENT DOCUMENTS

| 5,539,430 A | 7/1996 | Priem et al. | |
| 2008/0170052 A1* | 7/2008 | Ryu .......................... | G06F 3/14 345/204 |

(Continued)

FOREIGN PATENT DOCUMENTS

| CN | 101295476 A | 10/2008 |
| CN | 103544928 A | 1/2014 |

*Primary Examiner* — Wing H Chow
(74) *Attorney, Agent, or Firm* — Rabin & Berdo, P.C.

(57) ABSTRACT

A video transmission system is disclosed. The video transmission system comprises a multi-drop bus, a first source driving chip, a second source driving chip and a timing controller. The first source driving chip comprises a first source driving circuit and a first terminal circuit. The first terminal circuit is coupled to the multi-drop bus and the first source driving circuit for providing a first terminal resistor. The second source driving chip comprises a second source driving circuit and a second terminal circuit. The second terminal circuit is coupled to the multi-drop bus and the second source driving circuit for providing a second terminal resistor. The timing controller is coupled to the first source driving chip and the second source driving chip via the multi-drop bus.

19 Claims, 11 Drawing Sheets

(51) Int. Cl.
*H04N 5/44* (2011.01)
*G06F 13/40* (2006.01)

(56) References Cited

U.S. PATENT DOCUMENTS

| | | |
|---|---|---|
| 2008/0170063 A1 | 7/2008 | Ryu |
| 2009/0267654 A1 | 10/2009 | Hinz et al. |
| 2010/0225637 A1 | 9/2010 | Jeon et al. |
| 2011/0267101 A1 | 11/2011 | Oh et al. |
| 2012/0056870 A1 | 3/2012 | Koh |
| 2014/0192583 A1* | 7/2014 | Rajan .............. G11C 7/10 365/63 |

* cited by examiner

VIDEO TRANSMISSION SYSTEM

This application is a continuation application of U.S. patent application Ser. No. 14/328,078 filed Jul. 10, 2014, which claims the benefit of Taiwan application Serial No. 103116386, filed May 8, 2014, the contents of which are incorporated herein by reference.

BACKGROUND OF THE INVENTION

Field of the Invention

The invention relates in general to a transmission system, and more particularly to a video transmission system.

Description of the Related Art

Display is an electronic product that has been widely used. To provide truthful and vivid frames, both the resolution and the refresh rate of the display must be increased, and display of high-speed applications is thus provided. Facing the requirements of high-speed applications, the reflection and decay of transmission lines will make it difficult to increase the refresh rate of the display. Therefore, the transmission lines must have suitable impedance matching.

In the multi-drop configuration of the display, single output channel of the timing controller is coupled to a plurality of source driving chips via a pair of transmission lines. According to the conventional method, a terminal resistor is disposed on the part of a printed circuit board closest to an input terminal of a source driving chip to match the impedance of the transmission line. However, when the terminal resistor disposed on the printed circuit board does not match the impedance of the transmission line, signals will be reflected and result in transmission distortion.

SUMMARY OF THE INVENTION

The invention is directed to a video transmission system.

According to one embodiment of the present invention, a video transmission system is disclosed. The video transmission system comprises a multi-drop bus, a first source driving chip, a second source driving chip and a timing controller. The first source driving chip comprises a first source driving circuit and a first terminal circuit. The first terminal circuit is coupled to the multi-drop bus and the first source driving circuit for providing a first terminal resistor. The second source driving chip comprises a second source driving circuit and a second terminal circuit. The second terminal circuit is coupled to the multi-drop bus and the second source driving circuit for providing a second terminal resistor. The timing controller is coupled to the first source driving chip and the second source driving chip via the multi-drop bus.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
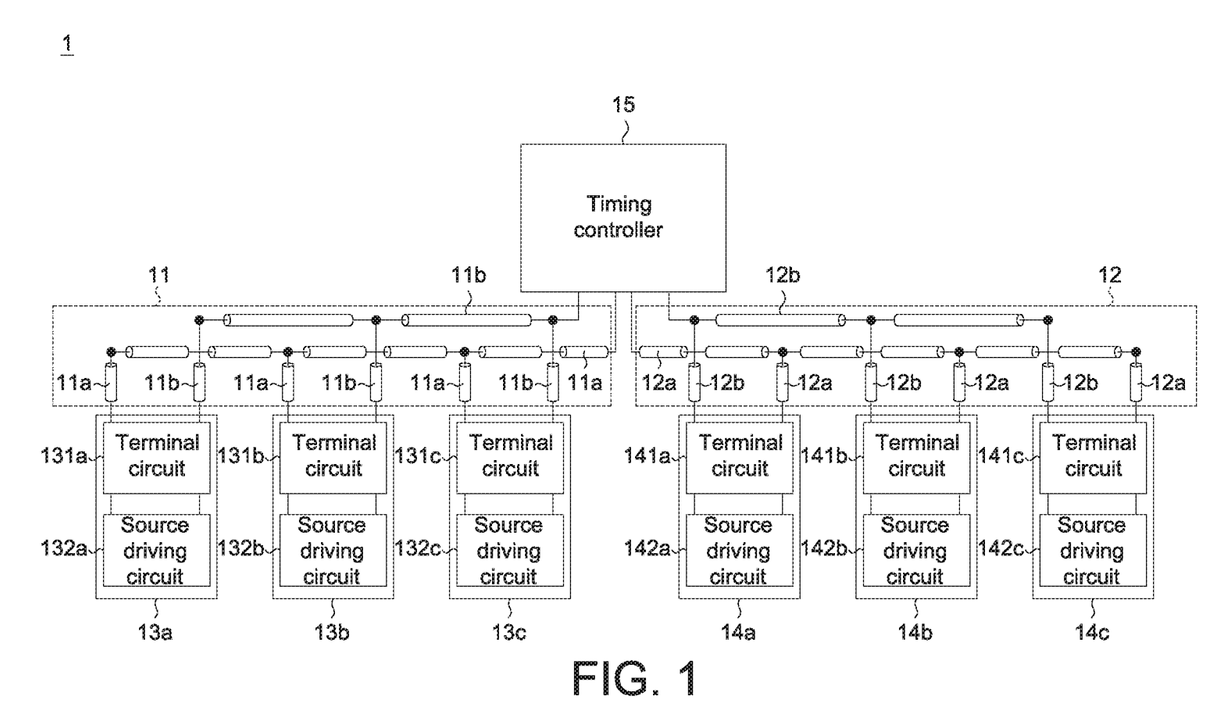
FIG. 1 is a schematic diagram of a video transmission system according to a first embodiment.

Referring to FIG. 1, a schematic diagram of a video transmission system according to a first embodiment is shown. The video transmission system 1 comprises a multi-drop bus 11, a multi-drop bus 12, source driving chips 13a~13c, source driving chips 14a~14c and a timing controller 15. The timing controller 15 is coupled to the source driving chips 13a~13c via the multi-drop bus 11, and is coupled to the source driving chips 14a~14c via the multi-drop bus 12. The source driving chip 13a comprises a terminal circuit 131a and a source driving circuit 132a. The terminal circuit 131a is coupled to the multi-drop bus 11 and the source driving circuit 132a for providing a terminal resistor. The source driving chip 13b comprises a terminal circuit 131b and a source driving circuit 132b. The terminal circuit 131b is coupled to the multi-drop bus 11 and the source driving circuit 132b for providing a terminal resistor. The source driving chip 13c comprises a terminal circuit 131c and a source driving circuit 132c. The terminal circuit 131c is coupled to the multi-drop bus 11 and the source driving circuit 132c for providing a terminal resistor.

The source driving chip 14a comprises a terminal circuit 141a and a source driving circuit 142a. The terminal circuit 141a is coupled to the multi-drop bus 12 and the source driving circuit 142a for providing a terminal resistor. The source driving chip 14b comprises a terminal circuit 141b and a source driving circuit 142b. The terminal circuit 141b is coupled to the multi-drop bus 12 and the source driving circuit 142b for providing a terminal resistor. The source driving chip 14c comprises a terminal circuit 141c and a source driving circuit 142c. The terminal circuit 141c is coupled to the multi-drop bus 12 and the source driving circuit 142c for providing a terminal resistor.

The multi-drop bus 11 and the multi-drop bus 12 transmit data according to such as the format of mini low-voltage differential signaling (mini-LVDS). The multi-drop bus 11 comprises transmission lines 11a and 11b. The multi-drop bus 12 comprises transmission lines 12a and 12b. The timing controller 15 is coupled to the source driving chips 13a~13c via the transmission lines 11a and 11b. The timing controller 15 is coupled to the source driving chips 14*a*~14*c* via the transmission lines 12*a* and 12*b*.

Figure 2:
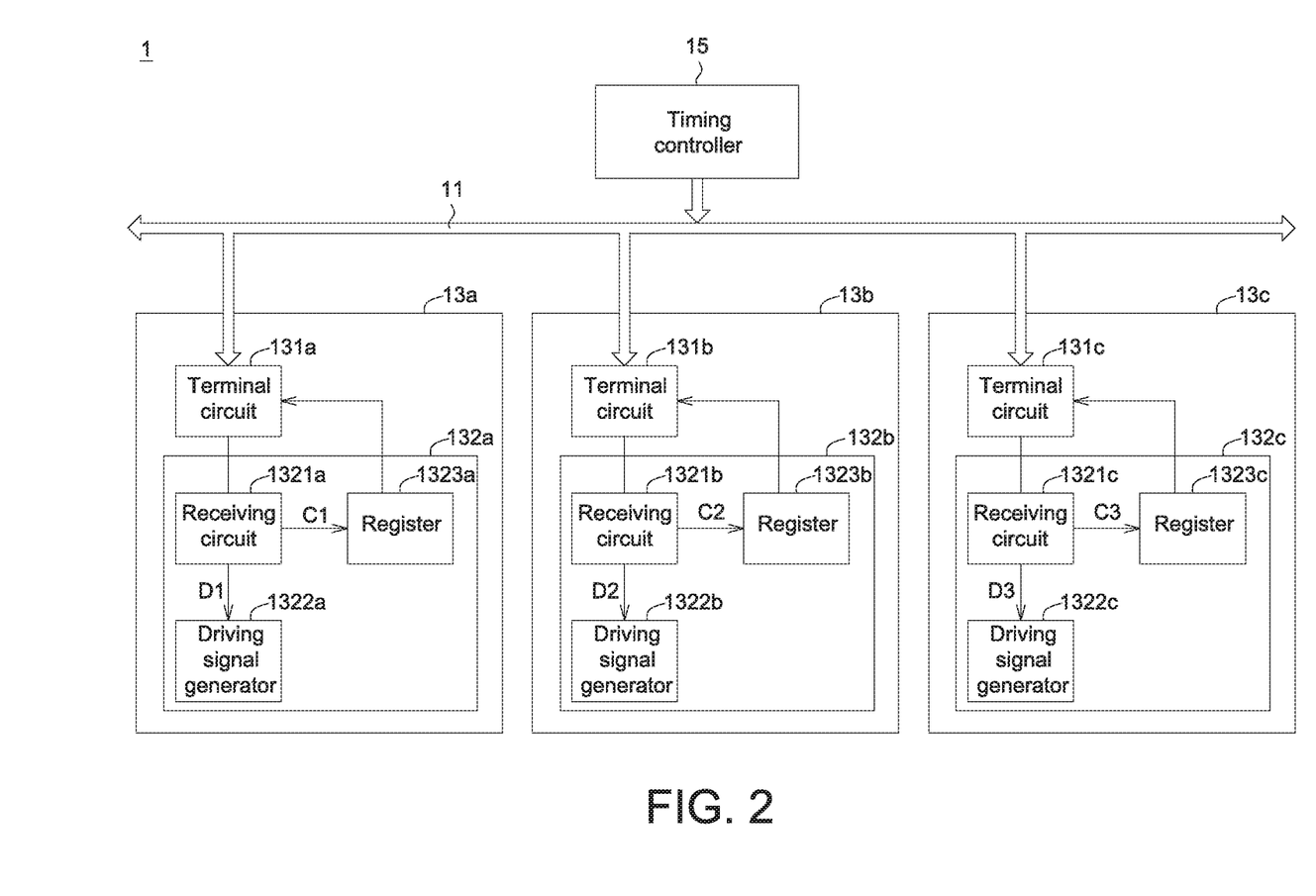
FIG. 2 is a partial schematic diagram of a video transmission system according to a first embodiment.
Figure 3:
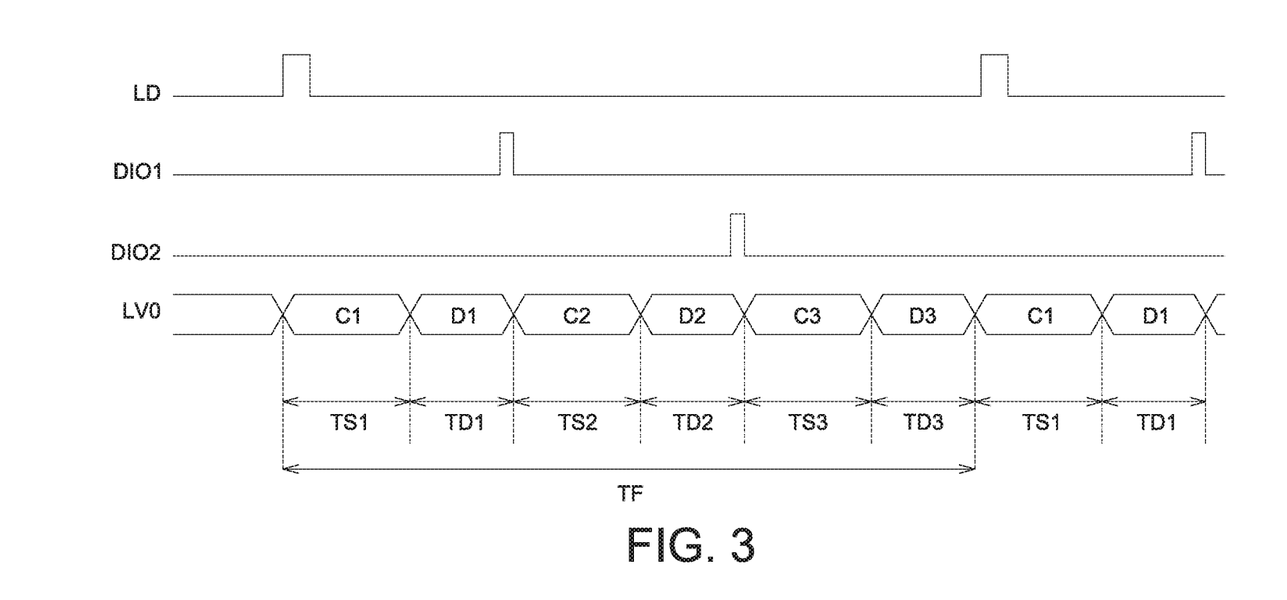
FIG. 3 is a timing diagram of video data transmission according to a first embodiment.

Refer to both FIG. 2 and FIG. 3. FIG. 2 is a partial schematic diagram of a video transmission system according to a first embodiment. FIG. 3 is a timing diagram of video data transmission according to a first embodiment. The source driving circuit 132*a* comprises a receiving circuit 1321*a*, a driving signal generator 1322*a* and a register 1323*a*. The source driving circuit 132*b* comprises a receiving circuit 1321*b*, a driving signal generator 1322*b* and a register 1323*b*. The source driving circuit 132*c* comprises a receiving circuit 1321*c*, a driving signal generator 1322*c* and a register 1323*c*.

Bus signal LV0 represents the setting command and video data transmitted via the multi-drop bus 11. The timing controller 15 transmits the bus signal LV0 to the source driving chips 13*a*~13*c* via the multi-drop bus 11. Download period LD indicates the start of each frame period TF. The timing controller 15 outputs the download signal LD to the source driving chip 13*a*. When the download signal LD appears, the receiving circuit 1321*a* receives a setting command C1 via the multi-drop bus 11 during a setting period TS1 and receives a video data D1 via the multi-drop bus 11 during a transfer period TD1. The transfer period TD1 is behind the setting period TS1. During the setting period TS1, the terminal circuit 131*a* provides a terminal resistor according to the setting command C1 and further connects the terminal resistor to the multi-drop bus 11. The driving signal generator 1322*a* outputs a corresponding source driving signal according to the video data D1. After the transfer period TD1 ends, the source driving chip 13*a* outputs a data input/output starting signal DIO1 to the source driving chip 13*b*.

After the data input/output starting signal DIO1 activates the source driving chip 13*b*, the receiving circuit 1321*b* receives a setting command C2 via the multi-drop bus 11 during a setting period TS2, and receives a video data D2 via the multi-drop bus 11 during a transfer period TD2. The transfer period TD2 is behind the setting period TS2. During the setting period TS2, the terminal circuit 131*b* provides a terminal resistor according to the setting command C2 and further connects the terminal resistor to the multi-drop bus 11. The driving signal generator 1322*b* outputs a corresponding source driving signal to the panel according to the video data D2. After the transfer period TD2 ends, the source driving chip 13*b* outputs a data input/output starting signal D102 to the source driving chip 13*c*.

After the data input/output starting signal D102 activates the source driving chip 13*b*, the receiving circuit 1321*c* receives a setting command C3 via the multi-drop bus 11 during a setting period TS3 and receives a video data D3 via the multi-drop bus 11 during a transfer period TD3. The transfer period TD3 is behind the setting period TS3. During the setting period TS3, the terminal circuit 131*c* provides a terminal resistor according to the setting command C3 and further connects the terminal resistor to the multi-drop bus 11. The driving signal generator 1322*c* outputs a corresponding source driving signal according to the video data D3.

In the above embodiments, the terminal circuits 131*a*~131*c* sequentially provide terminal resistors which can be connected in parallel via the multi-drop bus 11. However, the practical application is not limited to the above exemplification. In another embodiment, the terminal circuit 131*a* stops providing the terminal resistor after the transfer period TD1 ends. The terminal circuit 131*b* stops providing the terminal resistor after the transfer period TD2 ends. The terminal circuit 131*c* stops providing the terminal resistor after the transfer period TD3 ends. Thus, the terminal resistors provided by the terminal circuits 131*a*~131*c* will not be connected in parallel via the multi-drop bus 11. After the transmission of the video data is completed, all terminal circuits stop providing the terminal resistor.

Figure 4:
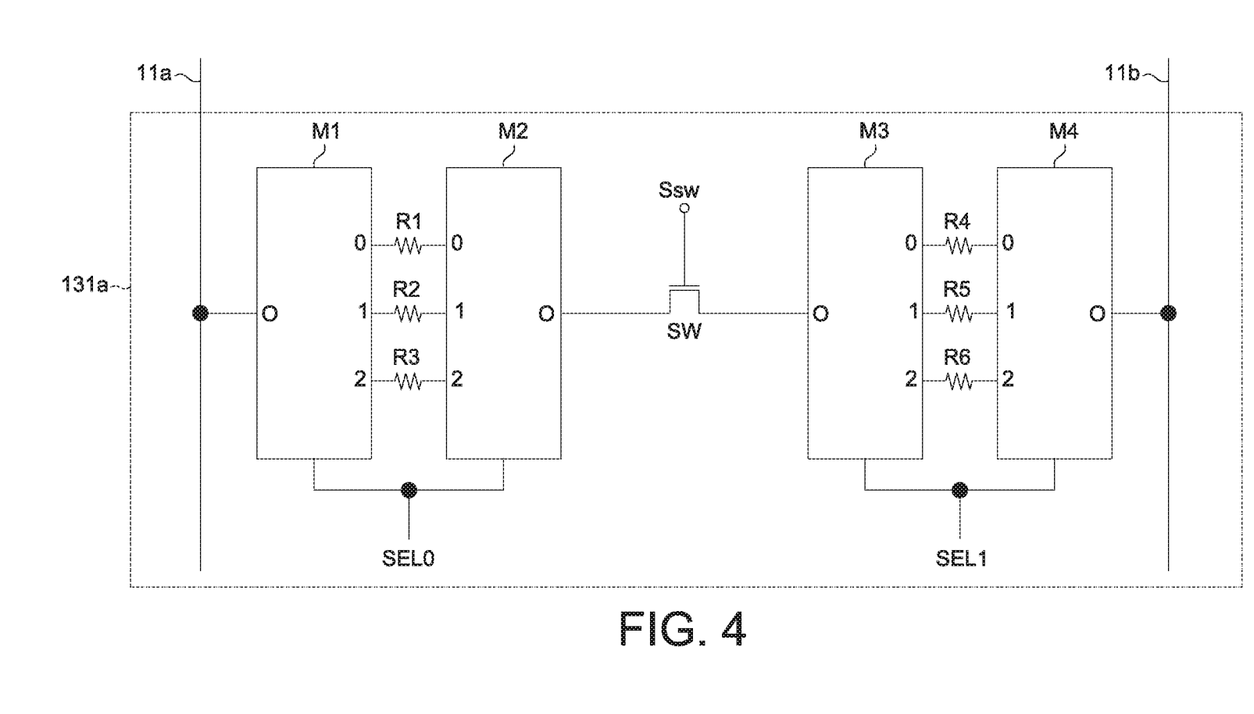
FIG. 4 is a schematic diagram of a terminal circuit according to a first embodiment.
Figure 5:
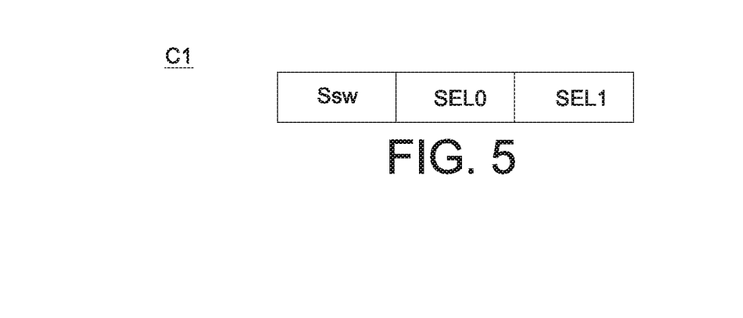
FIG. 5 is a schematic diagram of a setting command according to a first embodiment.

Refer to FIG. 2, FIG. 4 and FIG. 5 at the same time. FIG. 4 is a schematic diagram of a terminal circuit according to a first embodiment. FIG. 5 is a schematic diagram of a setting command according to a first embodiment. The circuit design of the terminal circuits 131*b* and 131*c* can be identical to that of the terminal circuit 131*a*. The setting command C1 comprises a switch signal Ssw and selection signals SEL0 and SEL1. The terminal circuit 131*a* comprises resistors R1~R6, a selection circuit and a switch SW. The switch signal Ssw is used for controlling the switch SW. The resistors R1~R3 have different resistances, and the resistors R4~R6 have different resistances. The selection circuit comprises multiplexers M1~M4.

During the setting period TS1, the multiplexers M1 and M2 select one of the resistors R1~R3 as the first candidate resistor according to the selection signal SEL0 of the setting command C1. During the setting period TS1, the multiplexer M3 and M4 select one of the resistors R4~R6 as the second candidate resistor according to the selection signal SEL1 of the setting command C1. During the setting period TS1, the switch SW is turned on according to the switch signal Ssw of the setting command C1 to provide a terminal resistor. During the setting period TS1, if the multiplexer M1 and M2 select the resistor R1 as the first candidate resistor and the multiplexer M3 and M4 select the resistor R4 as the second candidate resistor, then the terminal resistor provided by the terminal circuit 131*a* is a serial connection of resistors R1 and R4.

Figure 6:
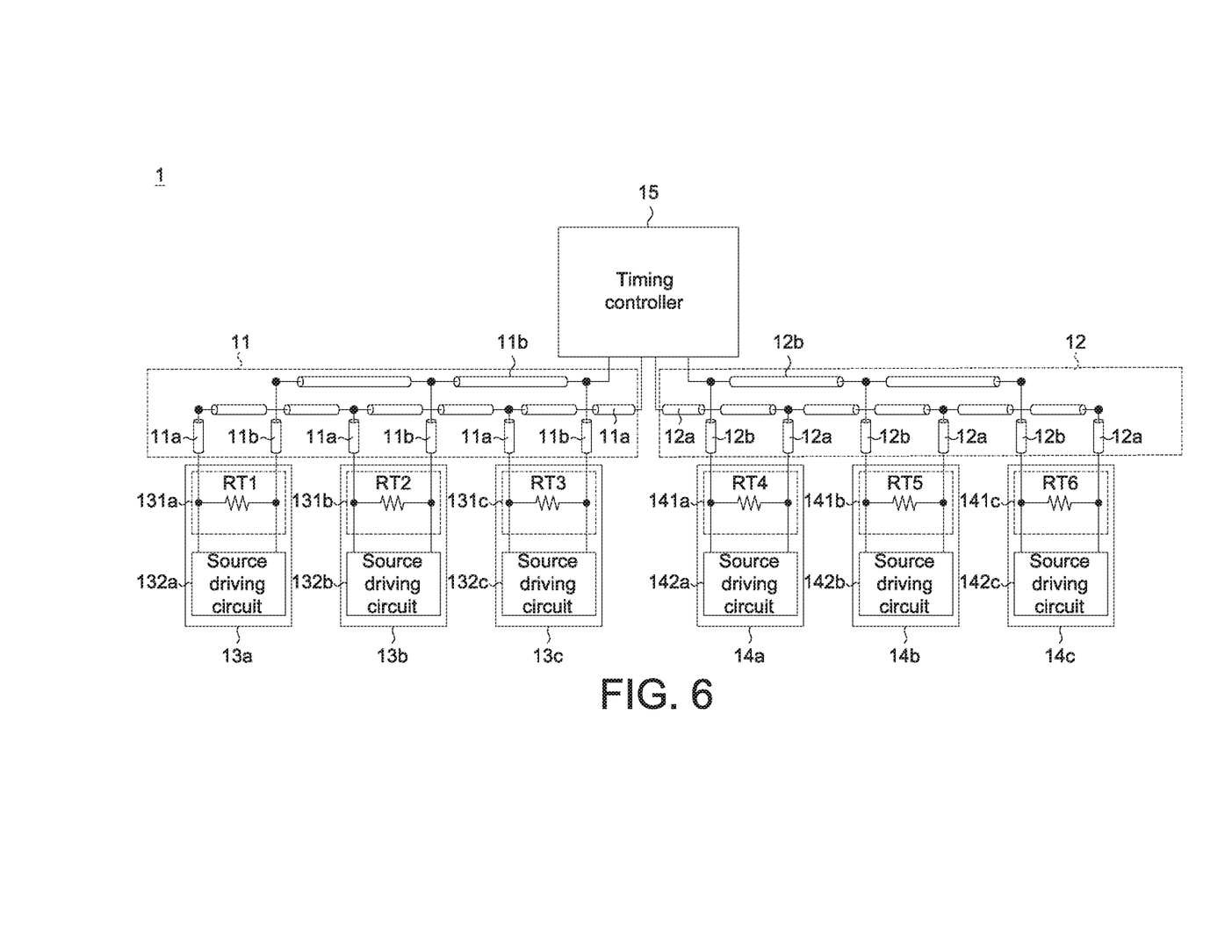
FIG. 6 is a schematic diagram of all terminal circuits concurrently providing terminal resistors.

Refer to FIG. 1, FIG. 4 and FIG. 6 at the same time. FIG. 6 is a schematic diagram of all terminal circuits concurrently providing terminal resistors. The terminal circuits 131*a*~131*c* respectively provide terminal resistors RT1~RT3. Two ends of the terminal resistors RT1~RT3 are concurrently coupled to the multi-drop bus 11. The terminal resistors RT1~RT3 can be formed by a combination of resistors R1~R6. For example, the terminal resistor RT1 can be realized by a serial connection of resistors R1 and R4. The terminal resistor RT2 can be realized by a serial connection of resistors R2 and R5. The terminal resistor RT3 can be realized by a serial connection of resistors R3 and R6. The terminal resistor RT1 and the terminal resistors RT2 and RT3 can be connected in parallel via the multi-drop bus 11. The terminal circuits 141*a*~141*c* respectively provide terminal resistors RT4~RT6, and two ends of terminal resistors RT4~RT6 are concurrently coupled to the multi-drop bus 12. The terminal resistor RT4 and the terminal resistors RT5 and RT6 can be connected in parallel via the multi-drop bus 12.

Figure 7:
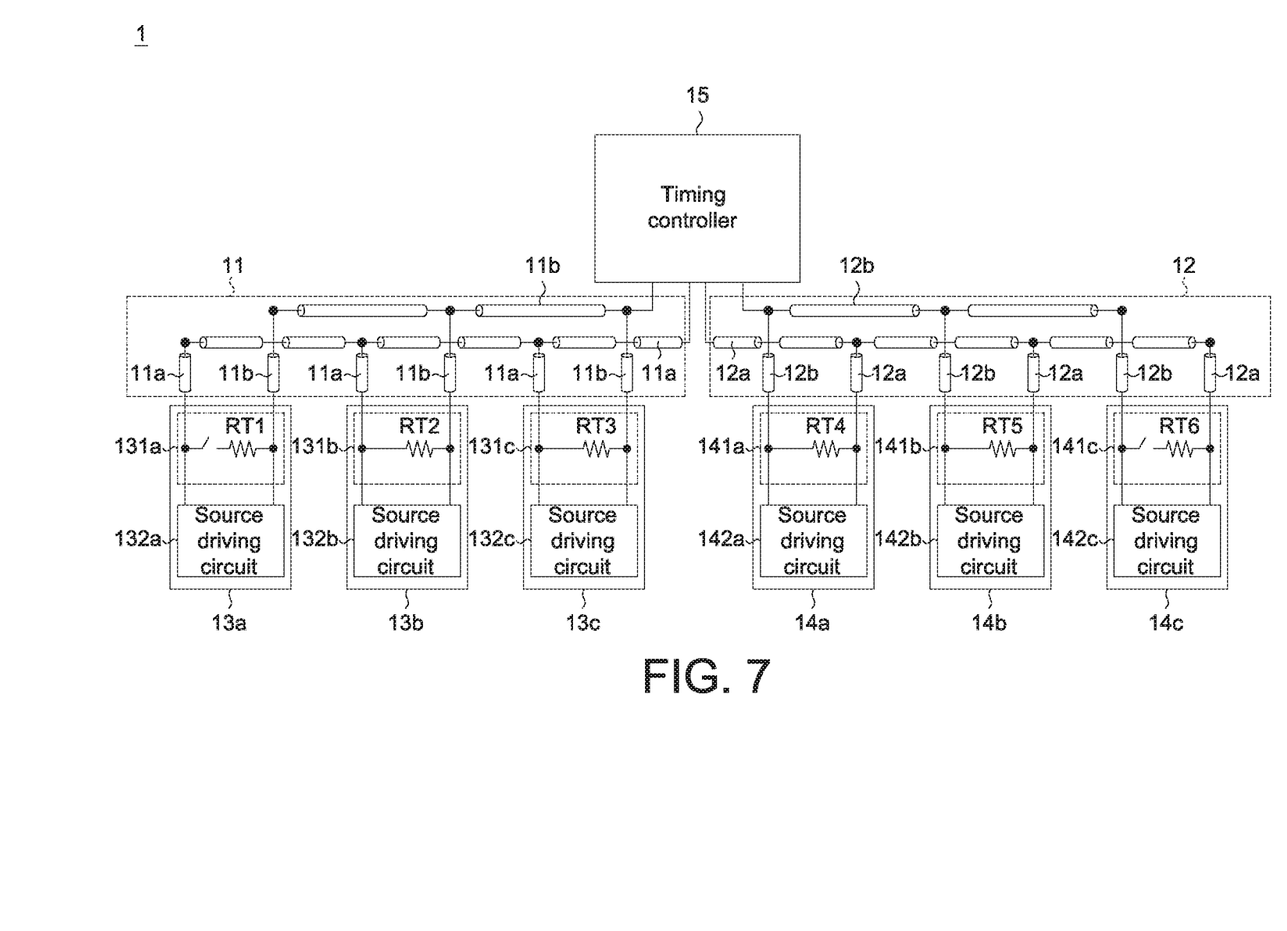
FIG. 7 is a schematic diagram of some of the terminal circuits providing a terminal resistor.

Refer to both FIG. 1 and FIG. 7. FIG. 7 is a schematic diagram of some of the terminal circuits providing a terminal resistor. The terminal circuits 131*b*, 131*c*, 141*a* and 141*b* respectively provide terminal resistors RT2, RT3, RT4 and RT5. The terminal circuits 131*a* and 141*c* do not provide terminal resistors RT1 and RT6. Two ends of the terminal resistors RT2 and RT3 are concurrently coupled to the multi-drop bus 11, and so are two ends of the terminal resistor RT4 and terminal resistor RT5 concurrently coupled to the multi-drop bus 12. Two ends of the terminal resistor RT1 are not concurrently coupled to the multi-drop bus 11, and nor are two ends of the terminal resistor RT6 concurrently coupled to the multi-drop bus 12.

Figure 8:
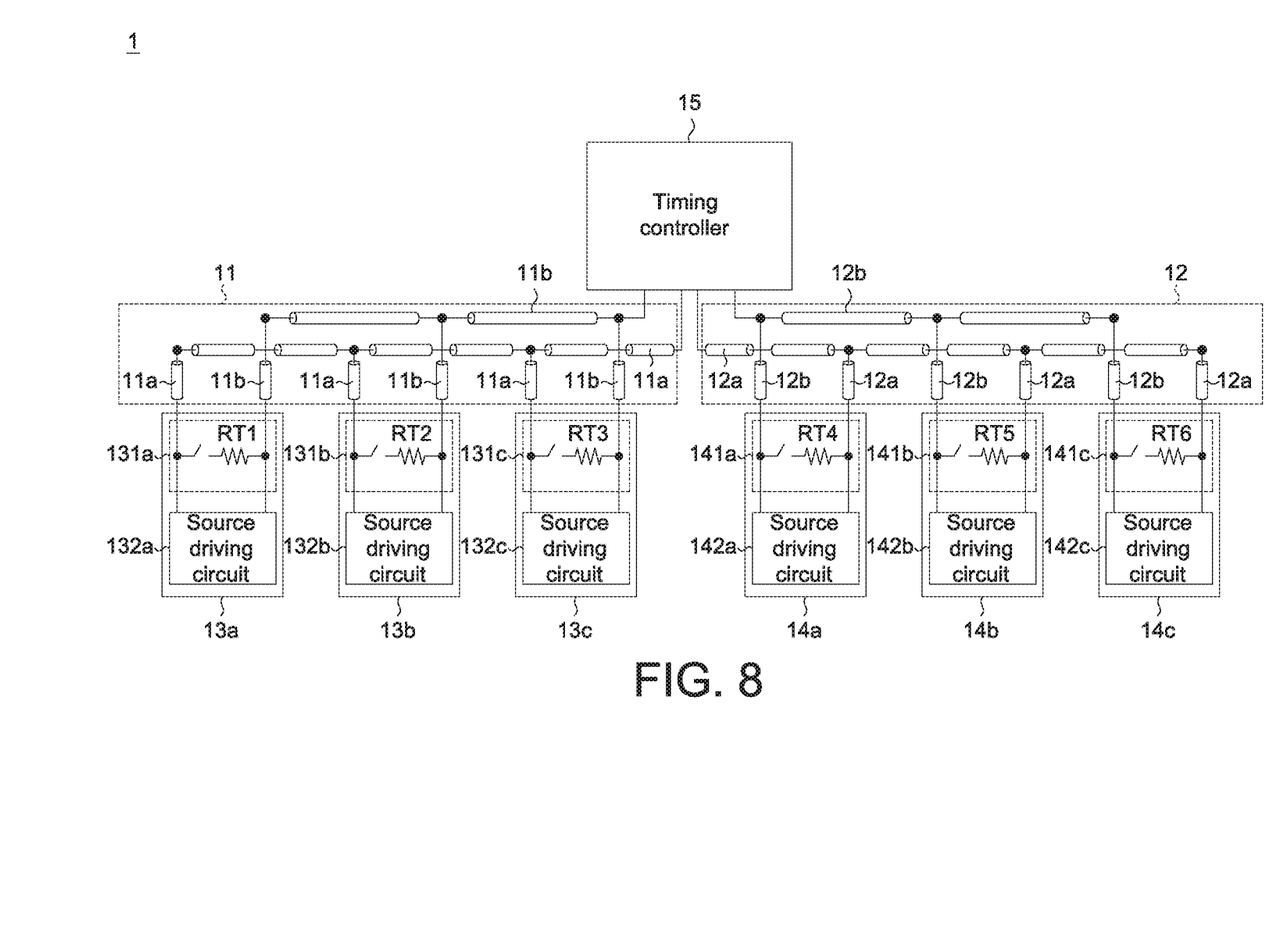
FIG. 8 is a schematic diagram of all terminal circuits concurrently not providing any terminal resistors.

Refer to both FIG. 1 and FIG. 8. FIG. 8 is a schematic diagram of all terminal circuits concurrently not providing any terminal resistors. The terminal circuits 131a~131c do not provide terminal resistors RT1~RT3 respectively. The terminal circuits 141a~141c do not provide terminal resistors RT4~RT6 respectively. Two ends of the terminal resistor RT1 are not concurrently coupled to the multi-drop bus 11, and nor are two ends of the terminal resistor RT2 concurrently coupled to the multi-drop bus 11. Two ends of the terminal resistor RT3 are not concurrently coupled to the multi-drop bus 11, and nor are two ends of the terminal resistor RT4 concurrently coupled to the multi-drop bus 12. Two ends of the terminal resistor RT5 are not concurrently coupled to the multi-drop bus 12, and nor are two ends of the terminal resistor RT6 concurrently coupled to the multi-drop bus 12.

Second Embodiment

Figure 9:
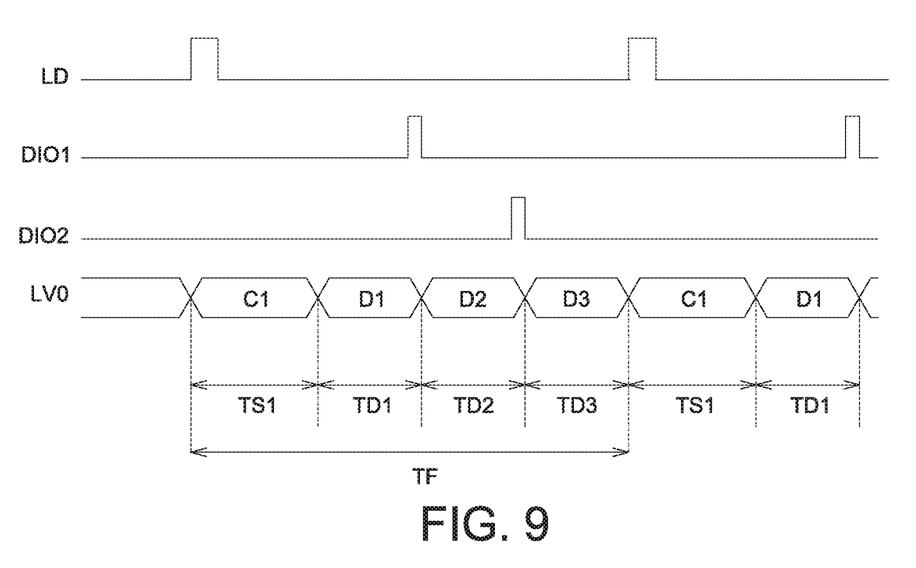
FIG. 9 is a timing diagram of video data transmission according to a second embodiment.

Refer to both FIG. 2 and FIG. 9. FIG. 9 is a timing diagram of video data transmission according to a second embodiment. The second embodiment is different from the first embodiment mainly in that during the setting period TS1, each of the terminal circuits 131a, 131b and 131c provides a terminal resistor according to the setting command C1 and further connects the terminal resistor to the multi-drop bus 11. Furthermore, the receiving circuit 1321a receives the setting command C1 via the multi-drop bus 11 during the setting period TS1 and receives the video data D1 via the multi-drop bus 11 during the transfer period TD1. During the setting period TS1, each of the terminal circuits 131a, 131b and 131c provides a terminal resistor according to the setting command C1 and further connects the terminal resistor to the multi-drop bus 11. The driving signal generator 1322a outputs a corresponding source driving signal according to the video data D1. After the transfer period TD1 ends, the source driving chip 13a outputs the data input/output starting signal DIO1 to the source driving chip 13b.

After the data input/output starting signal DIO1 activates the source driving chip 13b, the receiving circuit 1321b receives the video data D2 via the multi-drop bus 11 during the transfer period TD2. The transfer period TD2 is behind transfer period TD1. The driving signal generator 1322b outputs a corresponding source driving signal according to the video data D2. After the transfer period TD2 ends, the source driving chip 13b outputs the data input/output starting signal DIO2 to the source driving chip 13c. After the data input/output starting signal DIO2 activates the source driving chip 13b, the receiving circuit 1321c receives the video data D3 via the multi-drop bus 11 during the transfer period TD3. The transfer period TD3 is behind the transfer period TD2. The driving signal generator 1322c outputs a corresponding source driving signal according to the video data D3.

Third Embodiment

Figure 10:
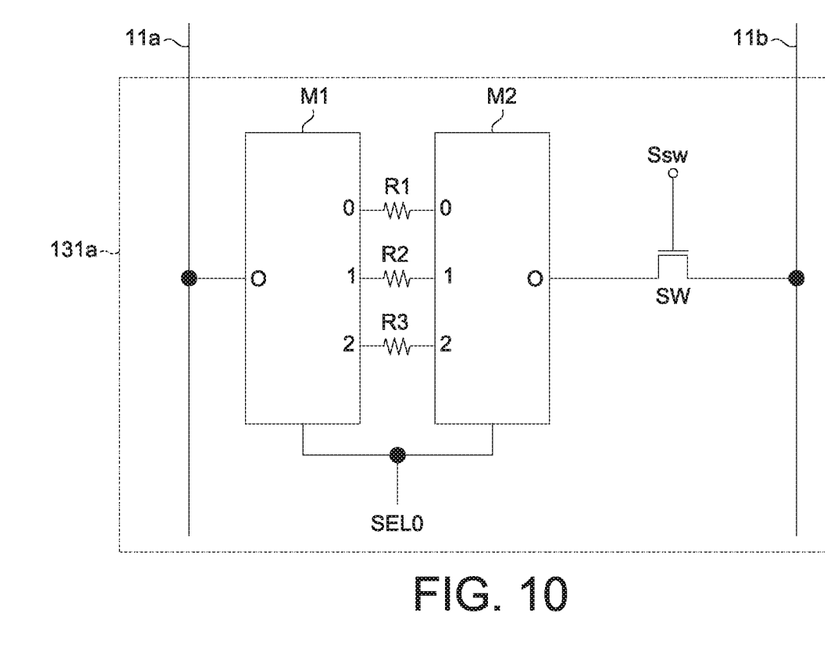
FIG. 10 is a schematic diagram of a terminal circuit according to a third embodiment.
Figure 11:
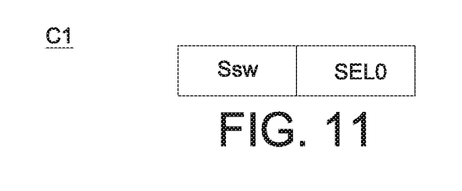
FIG. 11 is a schematic diagram of a setting command according to a third embodiment.

Refer to FIG. 2, FIG. 4, FIG. 5, FIG. 10 and FIG. 11 at the same time. FIG. 10 is a schematic diagram of a terminal circuit according to a third embodiment. FIG. 11 is a schematic diagram of a setting command according to a third embodiment. The third embodiment is different from the first embodiment mainly in that the terminal circuit 131a of the third embodiment does not comprise the multiplexers M3~M4 or the resistors R4~R6, and the setting command C1 of the third embodiment does not comprise the selection signal SEL1. During the setting period TS1, the multiplexers M1 and M2 select one of the resistors R1~R3 as a terminal resistor according to the selection signal SEL0 of the setting command C1. During the setting period TS1, the switch SW is turned on according to the switch signal Ssw of the setting command C1 to provide a terminal resistor.

Fourth Embodiment

Figure 12:
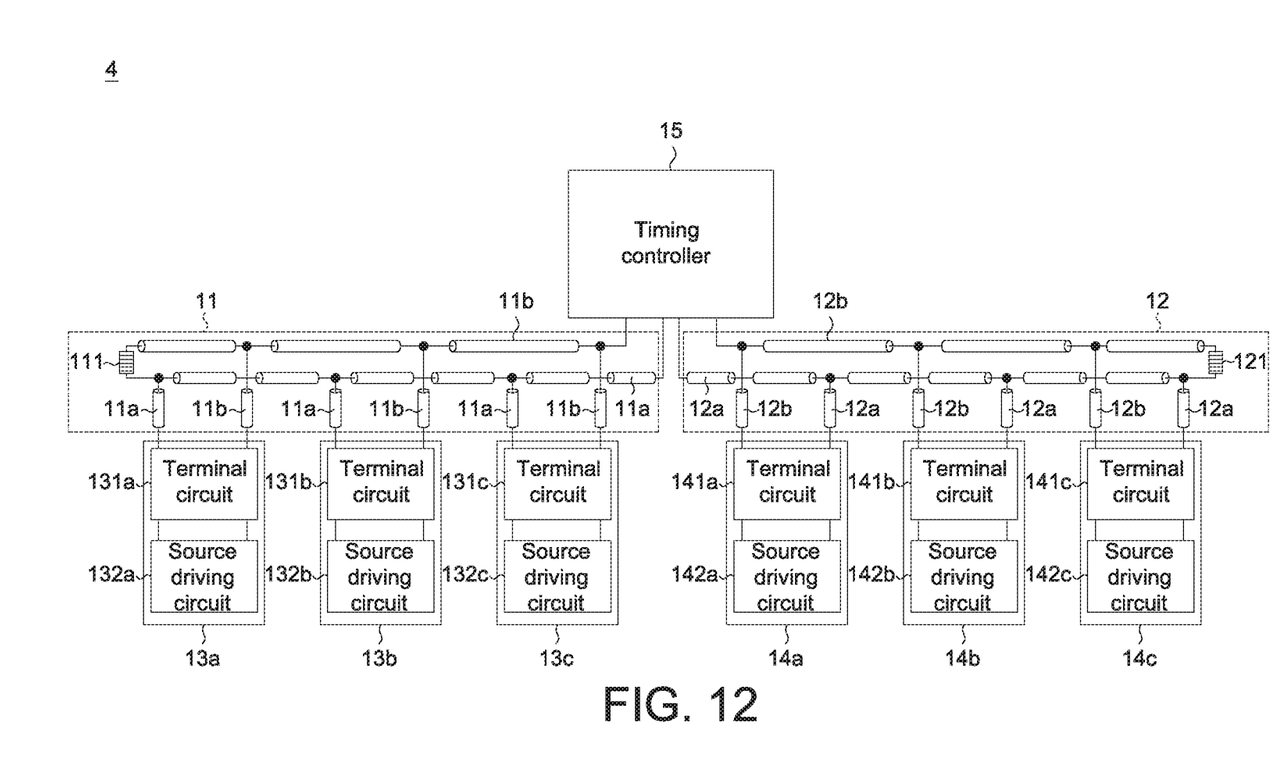
FIG. 12 is a schematic diagram of a video transmission system according to a fourth embodiment.

Refer to both FIG. 1 and FIG. 12. FIG. 12 is a schematic diagram of a video transmission system according to a fourth embodiment. The fourth embodiment is different from the first embodiment mainly in that the video transmission system 4 further comprises impedance matching elements 111 and 121. The impedance matching elements 111 and 121 can both be realized by such as a resistor, a capacitor or an inductor. The impedance matching element 111 is disposed in the multi-drop bus 11, and the impedance matching element 121 is disposed in the multi-drop bus 12. In addition to using the terminal resistors provided by the source driving chips 13a~13c and the source driving chips 14a~14c, the video transmission system 4 can further use the impedance matching elements 111 and 121 disposed outside the source driving chips 13a~13c and the source driving chips 14a~14c to increase the flexibility in the adjustment of impedance matching.

Fifth Embodiment

Figure 13:
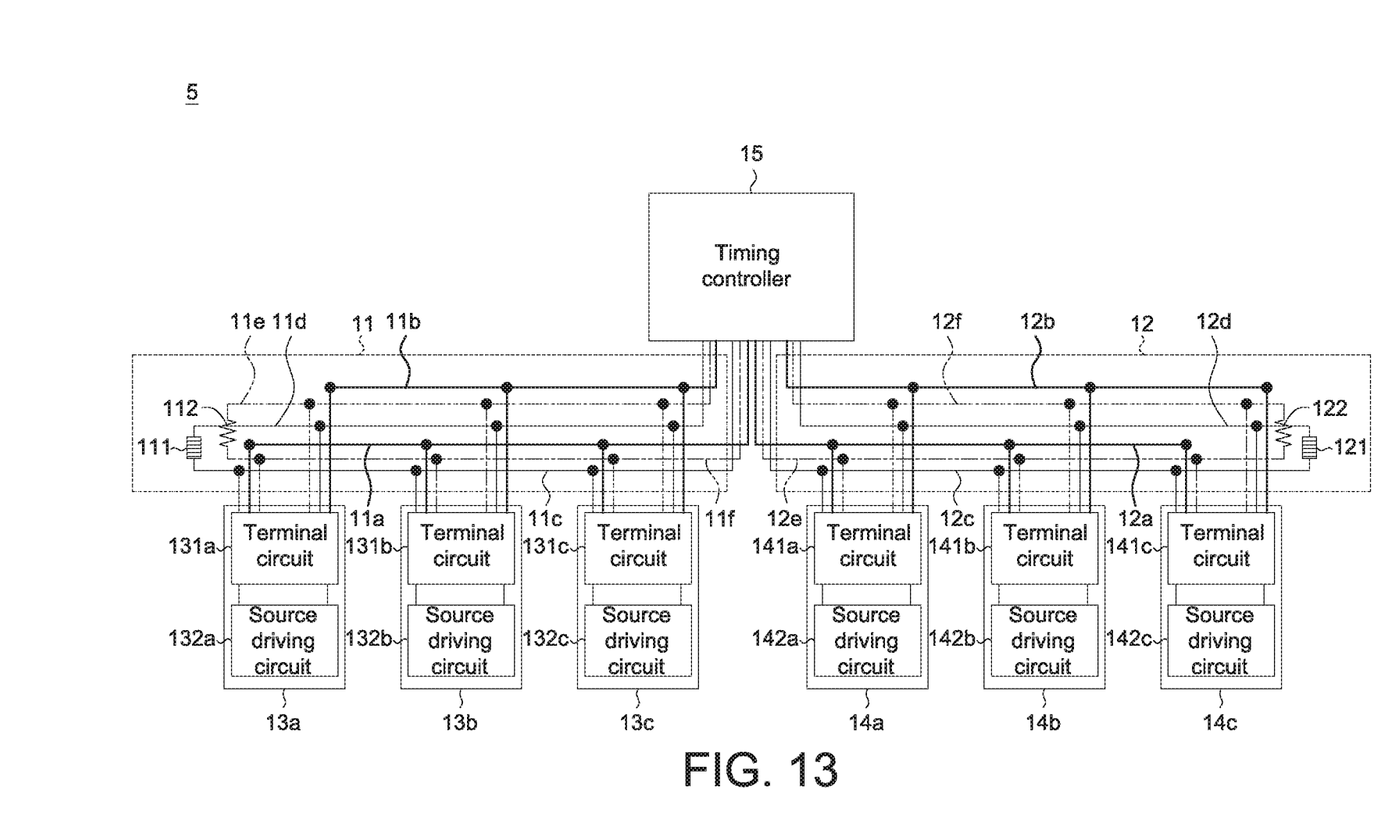
FIG. 13 is a schematic diagram of a video transmission system according to a fifth embodiment.

Refer to both FIG. 1 and FIG. 13. FIG. 13 is a schematic diagram of a video transmission system according to a fifth embodiment. The fifth embodiment is different from the first embodiment mainly in that the video transmission system 5 further comprises an impedance matching element 111, a terminal resistor 112, an impedance matching element 121 and a terminal resistor 122, and that the multi-drop bus 11 of the video transmission system 5 further comprises transmission lines 11c~11f and transmission lines 12c~12f. The impedance matching element 111 is disposed between transmission lines 11c and 11d. The impedance matching element 121 is disposed between the transmission lines 12c and 12d. The impedance matching element 111 can be incorporated with the impedance matching between the terminal resistor provided by the source driving chips 13a~13c and the transmission lines 11c and 11d. The impedance matching element 121 can be incorporated with the impedance matching between the terminal resistor provided by the source driving chips 14a~14c and the transmission lines 12c and 12d. The terminal resistor 112 is disposed between the transmission lines 11e and 11f. The terminal resistor 122 is disposed between the transmission lines 12e and 12f. The terminal resistor 112 is used for matching impedance with the transmission lines 11e and 11f. The terminal resistor 122 is used for matching impedance with the transmission lines 12e and 12f.

When a printed circuit board has a terminal resistor disposed therein, signals entering the source driving chip still have to pass through an impedance mismatching path, and the signals received by the source driving chip will be distorted. According to the video transmission system disclosed in above embodiments, terminal resistors are embedded in the source driving chip, hence shortening the impedance mismatching path and avoiding the signals received by the source driving chip being distorted. Besides, since the source driving chips are disposed at different positions, the resistances of the transmission lines between the timing controller and different source driving chips will be different accordingly. The terminal circuits disclosed in above embodiments are capable of flexibly adjusting the resistance of each terminal resistor, such that the source driving chips can achieve suitable impedance matching with the transmission lines.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video transmission system for driving a display panel, comprising:
    a multi-drop bus, comprising at least one first transmission line and at least one second transmission line, configured to transmit a bus signal;
    a timing controller;
    a first source driver, coupled to the timing controller via the at least one first transmission line of the multi-drop bus and comprising:
        a first source driving circuit, configured to drive the display panel; and
        a first terminal circuit coupled to the multi-drop bus and the first source driving circuit for providing a first adjustable resistance that is set in response to a first setting command as represented by the bus signal and output by the timing controller during a first setting period, wherein during a first transfer period of the bus signal, the first terminal circuit provides the first adjustable resistance and the timing controller transfers first video data as represented by the bus signal to the first source driving circuit; and
    a second source driver, coupled to the timing controller via the at least one second transmission line of the multi-drop bus and comprising:
        a second source driving circuit, configured to drive the display panel; and
        a second terminal circuit coupled to the multi-drop bus and the second source driving circuit for providing a second adjustable resistance that is set in response to a second setting command as represented by the bus signal and output by the timing controller during a second setting period, wherein during a second transfer period of the bus signal, the second terminal circuit provides the second adjustable resistance and the timing controller transfers the bus signal representing a second video data, to the second source driving circuit.

2. The video transmission system according to claim 1, wherein the first setting period is before the first transfer period; and the second setting period is before the second transfer period.

3. The video transmission system according to claim 2, wherein
    the first terminal circuit stops providing the first adjustable resistance after the first transfer period, and
    the second terminal circuit stops providing the second adjustable resistance after the second transfer period.

4. The video transmission system according to claim 2, wherein the first terminal circuit continually provides a first terminal resistor with the first adjustable resistance after the first transfer period or during the second transfer period.

5. The video transmission system according to claim 1, wherein the first adjustable resistance and the second adjustable resistance are set for impedance matching with the at least one first transmission line and the at least one second transmission line.

6. The video transmission system according to claim 1, wherein the first adjustable resistance and the second adjustable resistance are set to different values depending upon different resistances of the at least one first transmission line and the at least one second transmission line.

7. The video transmission system according to claim 1, wherein
    the first source driving circuit further comprises:
        a first receiving circuit for receiving the first setting command, the first setting command being represented by the bus signal and transmitted via the multi-drop bus during the first setting period and receiving the first video data as represented by the bus signal and transmitted via the multi-drop bus during the first transfer period, wherein the first setting period and the first transfer period are within a frame period; and a first driving signal generator outputting a plurality of first source driving signals according to the first video data, and
    wherein the second source driving circuit further comprises:
        a second receiving circuit receiving the second setting command as represented by the bus signal and transmitted via the multi-drop bus during the second setting period, and receiving the second video data as represented by the bus signal and transmitted via the multi-drop bus during the second transfer period, wherein the second setting period and the second transfer period are within the frame period; and
        a second driving signal generator outputting a plurality of second source driving signals according to the second video data.

8. The video transmission system according to claim 1, wherein each of the first and second terminal circuits comprises:
    a plurality of resistors having different resistances; and
    a selection circuit used for selecting some of the resistors according to the first or second setting command.

9. The video transmission system according to claim 1, wherein the first setting command and the second setting command are inserted in the bus signal transmitted from the timing controller to the first source driving circuit and the second source driving circuit, and the bus signal includes the first video data and the second video data.

10. The video transmission system according to claim 1, wherein each of the first and second adjustable resistances is set from multiple resistance values by the first setting command and second setting command, respectively.

11. A setting method applicable to a video transmission system configured to drive a display panel and comprising a timing controller, a first source circuit and a second source circuit, wherein the method comprises steps of:
    setting a first adjustable resistance coupled between a first transmission line and the first source circuit in response to a first setting command during a first setting period;
    providing first video data as represented by a bus signal from the timing controller to a first source driver during a first transfer period after the first setting period;
    providing the first adjustable resistance during the first transfer period;
    setting a second adjustable resistance coupled between a second transmission line and the second source circuit in response to a second setting command during a second setting period;

providing second video data as represented by the bus signal from the timing controller to a second source driver during a second transfer period after the second setting period; and providing the second adjustable resistance during the second transfer period.

12. The setting method according to claim 11, wherein the first adjustable resistance and the second adjustable resistance are set for impedance matching with the first transmission line and the second transmission line.

13. The setting method according to claim 11, wherein the first adjustable resistance and the second adjustable resistance are set to different values depending upon different resistances of the first transmission line and the second transmission line.

14. A video transmission system for driving a display panel, comprising:
a multi-drop bus comprising at least one first transmission line and at last one second transmission line, configured to transmit a bus signal;
a timing controller configured to generate video data as represented by the bus signal;
a first source driving circuit, and
a first terminal circuit coupled to the multi-drop bus and the first source driving circuit, wherein the first terminal circuit provides a first adjustable resistance value set in response to a first setting command represented by the bus signal, during a first period and stops providing the first adjustable resistance value during a second period;
a second source driving circuit, and
a second terminal circuit coupled to the multi-drop bus and the second source driving circuit, wherein the second terminal circuit provides a second adjustable resistance value set in response to a second setting command during a third period and stops providing the second adjustable resistance value during a fourth period, wherein
the first period comprises a first transfer period during which the video data as represented by the bus signal is transferred from the timing controller to the first source driving circuit, and
the third period comprises a second transfer period during which the video data as represented by the bus signal is transferred from the timing controller to the second source driver driving circuit.

15. The video transmission system according to claim 14, wherein the first adjustable resistance and the second adjustable resistance are set to different values depending upon different resistances of the at least one first transmission line and the at least one second transmission line.

16. The video transmission system according to claim 14, wherein the first setting command and the second setting command are inserted in the bus signal transmitted from the timing controller to the first and second source driving circuits, the bus signal including first video data and the bus signal including a second video data are respectively transmitted to the first and second source driving circuits.

17. The video transmission system according to claim 14, wherein each of the first and second adjustable resistances is set from multiple resistance values by the first setting command and second setting command, respectively.

18. A video transmission system for driving a display panel, comprising:
a multi-drop bus, comprising a plurality of transmission lines, configured to transmit a bus signal;
a timing controller; and
a plurality of source drivers configured to drive the display panel, each coupled to the timing controller via the multi-drop bus, wherein
each of the source drivers comprises
a source driving circuit, and
a terminal circuit, coupled to one corresponding transmission line of the transmission lines of the multi-drop bus, for respectively providing an adjustable resistance value, wherein
the bus signal being transmitted from the timing controller to the source drivers comprises at least two of a first period, a second period, and a third period, wherein
during the first period, the terminal circuits of all of the source drivers respectively provide the adjustable resistance values,
during the second period, the terminal circuit of at least one of the source drivers provides the adjustable resistance value and the terminal circuit of at least another one of the source drivers does not provide the adjustable resistance value, and
during the third period, the terminal circuits of all of the source drivers do not provide the respective resistance values.

19. The video transmission system according to claim 18, wherein at least two of the adjustable resistance values are set to different values depending upon different resistances of at least two of the transmission lines.

* * * * *